(12) United States Patent
Fujimoto et al.

(10) Patent No.: US 11,077,464 B2
(45) Date of Patent: Aug. 3, 2021

(54) VIBRATING DEVICE, CAMERA WATER-DROPLET-REMOVING DEVICE, AND CAMERA

(71) Applicant: Murata Manufacturing Co., Ltd., Nagaokakyo (JP)

(72) Inventors: Katsumi Fujimoto, Nagaokakyo (JP); Chikahiro Horiguchi, Nagaokakyo (JP); Kenji Nishiyama, Nagaokakyo (JP); Yasuhiro Kuratani, Nagaokakyo (JP); Shinichiro Ichiguchi, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 388 days.

(21) Appl. No.: 16/258,873

(22) Filed: Jan. 28, 2019

(65) Prior Publication Data

US 2019/0151897 A1    May 23, 2019

Related U.S. Application Data

(63) Continuation of application No. PCT/JP2017/026888, filed on Jul. 25, 2017.

(30) Foreign Application Priority Data

Nov. 30, 2016    (JP) .............................. JP2016-232612

(51) Int. Cl.
*B06B 1/06* (2006.01)
*G02B 7/02* (2021.01)
(Continued)

(52) U.S. Cl.
CPC .............. *B06B 1/06* (2013.01); *B06B 1/0607* (2013.01); *B06B 1/0651* (2013.01);
(Continued)

(58) Field of Classification Search
CPC .... B06B 1/06; B06B 1/0607; H04N 5/22521; H04N 5/225; H04N 5/2254; B60S 1/0848;
(Continued)

(56) References Cited

U.S. PATENT DOCUMENTS

2005/0254358 A1    11/2005    Kosako
2012/0057066 A1*   3/2012    Kawai ................ H04N 5/22521
                                                   348/340
(Continued)

FOREIGN PATENT DOCUMENTS

JP    H03159378    *    7/1991    ................ E01F 9/00
JP    05-32191 U          4/1993
(Continued)

OTHER PUBLICATIONS

Official Communication issued in International Patent Application No. PCT/JP2017/026888 dated Sep. 12, 2017.

*Primary Examiner* — Clayton E. LaBalle
*Assistant Examiner* — Kevin C Butler
(74) *Attorney, Agent, or Firm* — Keating & Bennett, LLP

(57) ABSTRACT

A vibrating device includes a tubular body including first and second end surfaces, and a side wall portion that connects the first and second end surfaces, a piezoelectric vibrator provided on the first end surface of the tubular body, and a light transmitting body that is directly or indirectly connected to the second end surface and covers an opening in the second end surface of the tubular body. A connecting portion is connected to the first end surface of the tubular body inside or outside an opening in the first end surface. A tubular bent portion is connected to a surface of the connecting portion that faces toward the second end surface of (Continued)

the tubular body. The tubular bent portion extends in a direction from the first end surface toward the second end surface of the tubular body.

20 Claims, 19 Drawing Sheets

(51) Int. Cl.
  *G03B 15/00* (2021.01)
  *G02B 27/00* (2006.01)
  *G03B 17/56* (2021.01)
  *H04N 5/225* (2006.01)
  *G03B 17/02* (2021.01)
  *G03B 17/08* (2021.01)
  *B60S 1/08* (2006.01)

(52) U.S. Cl.
  CPC ............. *B60S 1/0848* (2013.01); *G02B 7/02* (2013.01); *G02B 27/0006* (2013.01); *G03B 15/00* (2013.01); *G03B 17/02* (2013.01); *G03B 17/08* (2013.01); *G03B 17/56* (2013.01); *H04N 5/225* (2013.01); *H04N 5/22521* (2018.08)

(58) Field of Classification Search
  CPC ...... G02B 7/02; G02B 27/0006; G02B 7/021; G03B 15/00; G03B 17/02; G03B 17/08
  USPC .......................................................... 310/311
  See application file for complete search history.

(56) References Cited

U.S. PATENT DOCUMENTS

| | | | | |
|---|---|---|---|---|
| 2012/0243093 A1* | 9/2012 | Tonar | .................... | G03B 17/08 359/507 |
| 2014/0033454 A1* | 2/2014 | Koops | ................ | G02B 27/0006 15/94 |
| 2015/0202663 A1* | 7/2015 | Oba | ....................... | G03B 15/00 348/375 |
| 2015/0349236 A1* | 12/2015 | Furuta | ................ | H01L 41/0973 348/208.11 |
| 2016/0266379 A1* | 9/2016 | Li | ......................... | H04N 5/2171 |
| 2018/0095272 A1* | 4/2018 | Fujimoto | ................. | B06B 3/00 |
| 2018/0210194 A1* | 7/2018 | Nishiyama | ............... | B06B 1/06 |
| 2018/0221921 A1* | 8/2018 | Magee | .................... | B08B 7/028 |
| 2018/0239218 A1* | 8/2018 | Ikeuchi | ............. | G02B 27/0006 |
| 2018/0243804 A1* | 8/2018 | Magee | ..................... | B08B 7/04 |
| 2018/0246323 A1* | 8/2018 | Fedigan | ............ | G02B 27/0006 |
| 2018/0264526 A1* | 9/2018 | Kim | ......................... | B08B 3/12 |
| 2018/0275397 A1* | 9/2018 | Chung | ............. | G02B 27/0006 |
| 2018/0292646 A1* | 10/2018 | Fujimoto | .............. | G03B 17/08 |
| 2018/0334109 A1* | 11/2018 | Trebouet | ........... | G02B 27/0006 |
| 2018/0335505 A1* | 11/2018 | Bretagnol | ............ | G01S 17/931 |
| 2019/0033685 A1* | 1/2019 | Fujimoto | .............. | G03B 17/08 |
| 2019/0151897 A1* | 5/2019 | Fujimoto | .............. | H04N 5/2171 |
| 2019/0176195 A1* | 6/2019 | Fujimoto | .............. | H04N 5/225 |
| 2020/0038914 A1* | 2/2020 | Fujimoto | ............. | B06B 1/0648 |
| 2020/0055087 A1* | 2/2020 | Fujimoto | ........... | G02B 27/0006 |
| 2020/0057301 A1* | 2/2020 | Kuratani | ................ | B08B 7/02 |
| 2020/0144939 A1* | 5/2020 | Fujimoto | .......... | H04N 5/22521 |
| 2020/0213495 A1* | 7/2020 | Fujimoto | .............. | G03B 17/02 |
| 2020/0230663 A1* | 7/2020 | McBride | ............ | H04N 5/23248 |
| 2020/0254979 A1* | 8/2020 | Bretagnol | ................ | B60S 1/56 |
| 2020/0338607 A1* | 10/2020 | Kitamori | ................ | B08B 7/02 |
| 2020/0379320 A1* | 12/2020 | Fujimoto | ............ | G02B 27/646 |
| 2020/0379321 A1* | 12/2020 | Fujimoto | ................. | B06B 1/06 |
| 2020/0406298 A1* | 12/2020 | Fujimoto | ................. | H01L 41/09 |
| 2021/0061186 A1* | 3/2021 | Nishiyama | ............. | G03B 17/02 |
| 2021/0063729 A1* | 3/2021 | Shimizu | ................. | H05B 3/84 |
| 2021/0080619 A1* | 3/2021 | Nagata | .................. | G03B 17/02 |
| 2021/0084199 A1* | 3/2021 | Kishi | ................. | G02B 27/0006 |

FOREIGN PATENT DOCUMENTS

| | | | | |
|---|---|---|---|---|
| JP | H0532191 | * | 4/1993 | ............... B60R 1/00 |
| JP | 2005-328202 A | | 11/2005 | |
| JP | 2007-082062 A | | 3/2007 | |
| JP | 2012-138768 A | | 7/2012 | |
| JP | 2013-080177 A | | 5/2013 | |
| JP | 2013080177 | * | 5/2013 | ............... B60R 1/00 |

* cited by examiner

MAXIMUM VALUE: 501.976
MINIMUM VALUE:    0.826

MAXIMUM VALUE: 878.295
MINIMUM VALUE: 69.734

MAXIMUM VALUE: 689.852
MINIMUM VALUE:  16.871

MAXIMUM VALUE: 254.905
MINIMUM VALUE:   6.932

MAXIMUM VALUE: 360.666
MINIMUM VALUE:   3.253

VIBRATING DEVICE, CAMERA WATER-DROPLET-REMOVING DEVICE, AND CAMERA

CROSS REFERENCE TO RELATED APPLICATIONS

This application claims the benefit of priority to Japanese Patent Application No. 2016-232612 filed on Nov. 30, 2016 and is a Continuation Application of PCT Application No. PCT/JP2017/026888 filed on Jul. 25, 2017. The entire contents of each application are hereby incorporated herein by reference.

BACKGROUND OF THE INVENTION

1. Field of the Invention

The present invention relates to a vibrating device including a piezoelectric vibrator and a tubular body, a camera water-droplet-removing device including the vibrating device, and a camera.

2. Description of the Related Art

Vehicle-mounted cameras and cameras installed outdoors are exposed to rain. Accordingly, a cover made of glass or transparent plastic is placed in front of a lens. However, water droplets that have adhered to the cover may reduce the clarity of the view of the camera and hinder accurate image capture.

Japanese Unexamined Patent Application Publication No. 2012-138768 discloses a dome-shaped cover for such use. The dome-shaped cover is connected to a cylindrical portion, and a piezoelectric ceramic vibrator is attached to the cylindrical portion. The piezoelectric ceramic vibrator is vibrated to vibrate the cylindrical portion and the dome-shaped cover, thus removing water droplets that have adhered to the surface of the dome-shaped cover.

Japanese Unexamined Patent Application Publication No. 2007-82062 discloses a structure in which an ultrasonic transducer, an adhesive layer, and an external lens are disposed in front of a camera main body. The ultrasonic transducer is driven to vibrate the external lens, thus removing water droplets.

According to Japanese Unexamined Patent Application Publication No. 2012-138768 and Japanese Unexamined Patent Application Publication No. 2007-82062, a large vibration of the dome-shaped cover or the external lens needs to be generated to remove the water droplets. Furthermore, substances to be removed include not only water droplets but also solutions other than water, such as ethanol, aqueous solutions of salt, an antifreezing agent (calcium chloride), etc., droplets of liquid containing water insoluble impurities, such as mud water, and colloidal solutions, such as coffee. Thus, according to the structures of Japanese Unexamined Patent Application Publication No. 2012-138768 and Japanese Unexamined Patent Application Publication No. 2007-82062, the piezoelectric ceramic vibrator or the ultrasonic transducer is required to generate a large vibration. Accordingly, the piezoelectric ceramic vibrator or the ultrasonic transducer receives a large stress, and cracks may be formed therein as a result of use over time. This may lead to malfunction of the piezoelectric ceramic vibrator or the ultrasonic transducer.

SUMMARY OF THE INVENTION

Preferred embodiments of the present invention provide vibrating devices each capable of easily removing water droplets or other substances that have adhered to a cover or a lens without placing a large load on a piezoelectric vibrator, and further provide camera water-droplet-removing devices each including a vibrating device according to a preferred embodiment of the present invention and cameras each including a camera water-droplet-removing device according to a preferred embodiment of the present invention.

A vibrating device according to a preferred embodiment of the present invention includes a tubular body including a first end surface, a second end surface that is opposite to the first end surface, and a side wall portion that connects the first and second end surfaces, the first and second end surfaces each including an opening; a piezoelectric vibrator provided on the first end surface of the tubular body; and a light transmitting body that is directly or indirectly connected to the second end surface of the tubular body and covers the opening in the second end surface of the tubular body. A connecting portion is connected to the first end surface of the tubular body in a region inside or outside the opening in the first end surface, and a tubular bent portion is connected to a surface of the connecting portion that faces toward the second end surface of the tubular body, the tubular bent portion extending in a direction from the first end surface toward the second end surface of the tubular body.

In a vibrating device according to a preferred embodiment of the present invention, the connecting portion is connected to an outer side of the first end surface of the tubular body, and the bent portion faces an outer surface of the side wall portion. In this case, a support may be easily provided at the outer surface of the side wall portion of the tubular body.

In a vibrating device according to a preferred embodiment of the present invention, the connecting portion is connected to an inner side of the first end surface of the tubular body, and the bent portion faces an inner surface of the side wall portion. In this case, the outer size of the vibrating device is reduced.

In a vibrating device according to a preferred embodiment of the present invention, the vibrating device further includes a support member connected to the side wall portion of the tubular body.

In a vibrating device according to a preferred embodiment of the present invention, the tubular body is cylindrical.

In a vibrating device according to a preferred embodiment of the present invention, the piezoelectric vibrator extends from the first end surface of the tubular body to a surface of the connecting portion that faces away from the second end surface.

In a vibrating device according to a preferred embodiment of the present invention, when a direction connecting the first end surface and the second end surface of the tubular body is defined as a length direction of the tubular body, a sum of a dimension of the bent portion in the length direction and a dimension of the connecting portion in the length direction is less than or equal to about ½ of a dimension of the tubular body in the length direction. In this case, the outer shape of the bent portion is reduced.

A camera water-droplet-removing device according to a preferred embodiment of the present invention includes a vibrating device according to a preferred embodiment of the present invention. The camera water-droplet-removing device is used for a camera main body including a lens. The light transmitting body is the lens of the camera main body or a cover member including a light transmitting portion disposed in front of the lens of the camera main body.

A camera according to a preferred embodiment of the present invention includes a camera water-droplet-removing device including a vibrating device according to a preferred embodiment of the present invention, and a camera main body, at least a portion of which is disposed in the camera water-droplet-removing device.

According to the vibrating devices, the camera water-droplet-removing devices, and the cameras of preferred embodiments of the present invention, water droplets or other substances that have adhered to a light transmitting body, such as a lens or a cover member, are able to easily removed without placing a large load on a piezoelectric vibrator.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described below with reference to the accompanying drawings.

It is to be noted that each of the preferred embodiments described in this specification is illustrative, and partial replacements and combinations of the structures of different preferred embodiments are possible.

Figure 1:
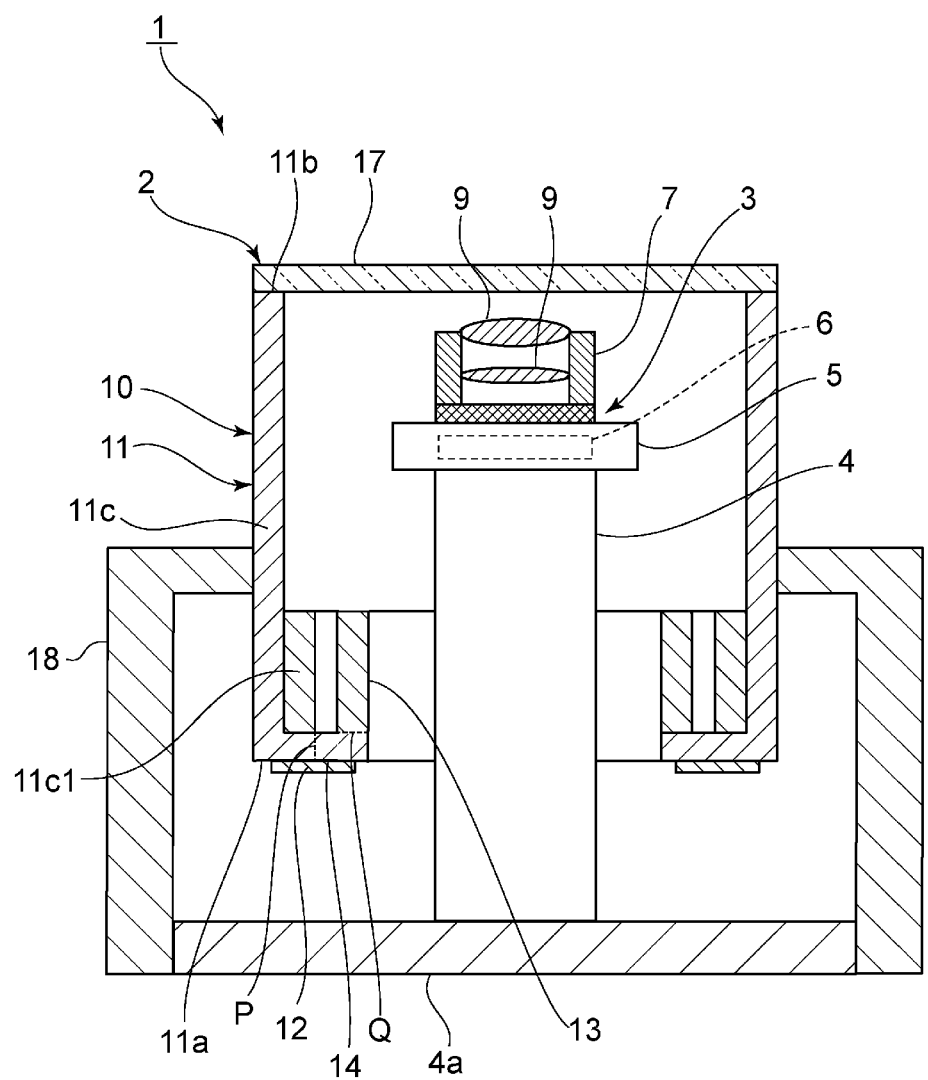
FIG. 1 is a front sectional view of a camera according to a first preferred embodiment of the present invention.
Figure 2:
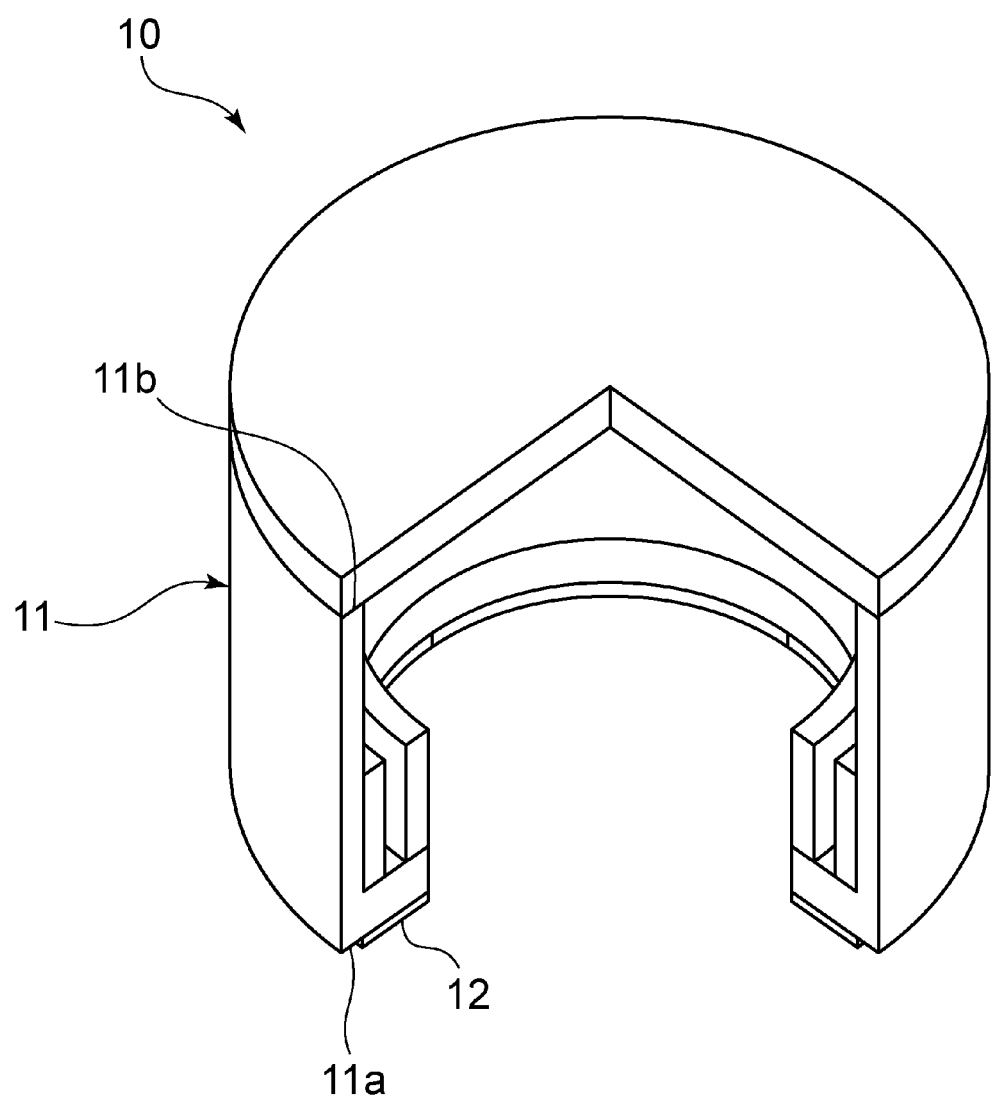
FIG. 2 is a partially cutaway sectional perspective view of a vibrating device used in the first preferred embodiment of the present invention.

FIG. 1 is a front sectional view of a camera according to a first preferred embodiment of the present invention. FIG. 2 is a partially cutaway sectional perspective view of the vibrating device. A camera 1 includes a camera water-droplet-removing device 2. The camera water-droplet-removing device 2 includes a camera main body 3 therein. It is not necessary that the entirety of the camera main body 3 be disposed in the camera water-droplet-removing device 2 as long as at least a portion of the camera main body 3 is disposed in the camera water-droplet-removing device 2.

The camera main body 3 includes a tubular main body member 4. The bottom end of the main body member 4 is fixed to a base plate 4a. An imaging unit 5 is fixed to the top end of the main body member 4. A circuit 6 including an imaging device is mounted in the imaging unit 5. A lens module 7 is secured to a surface of the imaging unit 5 at an end opposite to the end at which the main body member 4 is provided. The lens module 7 includes a tubular body. A plurality of lenses 9 are disposed in the lens module 7.

The structure of the above-described camera main body 3 is not particularly limited as long as the camera main body 3 is capable of capturing an image of an object in front of the lenses 9. Here, the front is the side at which a light transmitting body 17, which will be described below, is disposed.

A vibrating device 10 includes a tubular body 11 and an annular piezoelectric vibrator 12.

The tubular body 11 preferably has a cylindrical shape, for example.

The tubular body 11 includes a first end surface 11a and a second end surface 11b that is opposite to the first end surface 11a. The direction connecting the first end surface 11a and the second end surface 11b is defined as a length direction of the tubular body 11. A portion that connects the first end surface 11a and the second end surface 11b is a side wall portion 11c preferably having a cylindrical shape, for example. The first end surface 11a and the second end surface 11b each include an opening. The side wall portion 11c is connected to a bent portion 13 by a connecting portion 14 at the first end surface 11a. The connecting portion 14 is provided integrally with the side wall portion 11c. The connecting portion 14 may instead be a separate member from the side wall portion 11c and joined to the side wall portion 11c. The connecting portion 14 extends in a direction orthogonal or substantially orthogonal to the length direction, that is, inward from the first end surface 11a in a radial direction of the tubular body 11. The connecting portion 14 preferably has an annular shape, for example. The bent portion 13 is connected to the annular connecting portion 14. The bent portion 13 extends from a surface of the connecting portion 14 that faces toward the second end surface 11b in a direction from the first end surface 11a toward the second end surface 11b.

In FIG. 1, a broken line P indicates the boundary between the side wall portion 11c, which includes a thick portion 11c1, and the connecting portion 14. A broken line Q indicates the boundary between the connecting portion 14 and the bent portion 13. The bent portion 13 extends in the direction from the first end surface 11a toward the second end surface 11b. The bent portion 13 faces the inner surface of the side wall portion 11c.

In the present preferred embodiment, the side wall portion 11c includes the thick portion 11c1, which faces the bent portion 13. The bent portion 13 faces the thick portion 11c1 with a gap therebetween. It is not necessary for the thick portion 11c1 to be provided.

In the present preferred embodiment, the thick portion 11c1 and the bent portion 13 have the same or substantially the same dimension in the length direction. The thick portion 11c1 and the bent portion 13 may instead have different dimensions in the length direction. The bent portion 13 preferably has a cylindrical shape, for example.

The tubular body 11 changes a breathing vibration mode, which is a mode of vibration of the piezoelectric vibrator 12 excited in the radial direction of the tubular body 11, to a bending vibration mode, which is a mode of vibration of the light transmitting body 17 in the length direction of the tubular body 11. In addition, since the thick portion 11c1 is provided, the tubular body 11 also increases the vibration displacement of the light transmitting body 17 beyond the displacement of the piezoelectric vibrator 12. Thus, the thick portion 11c1 is preferably provided.

As described above, the tubular body 11 has the shape of an inwardly bent cylindrical body such that the bent portion 13 is connected to the side wall portion 11c by the connecting portion 14.

The light transmitting body 17 is provided on the second end surface 11b and covers the opening in the second end surface 11b of the tubular body 11. The light transmitting body 17 is disposed in front of the lenses 9. Preferably, the light transmitting body 17 is joined to the second end surface 11b over the entire or substantially the entire circumference thereof to close the opening in the second end surface 11b of the tubular body 11. Although the light transmitting body 17 is a cover in the present preferred embodiment, the light transmitting body 17 may instead be one of the lenses 9.

One end of a support 18 is connected to the outer surface of the side wall portion 11c of the tubular body 11. The support 18 is preferably provided at a location at which a vibration node is present in a vibration mode of the tubular body and the piezoelectric vibrator, which will be described below. The other end of the support 18 is fixed to the base plate 4a.

The tubular body 11 is preferably made of an elastic material, such as a metal, for example. The metal is preferably stainless steel, for example, because stainless steel is highly anticorrosive.

The light transmitting body 17 is preferably made of transparent glass or synthetic resin, for example. At least a portion of the light transmitting body 17 that is in front of the lenses 9 transmits light.

The support 18 is preferably made of an inorganic material, such as a metal, or a synthetic resin, for example.

The thick portion 11c1, the connecting portion 14, and the bent portion 13 are preferably made of the same material as the material of the side wall portion 11c, but may instead be made of materials different from the material of the side wall portion 11c.

Figure 3A:
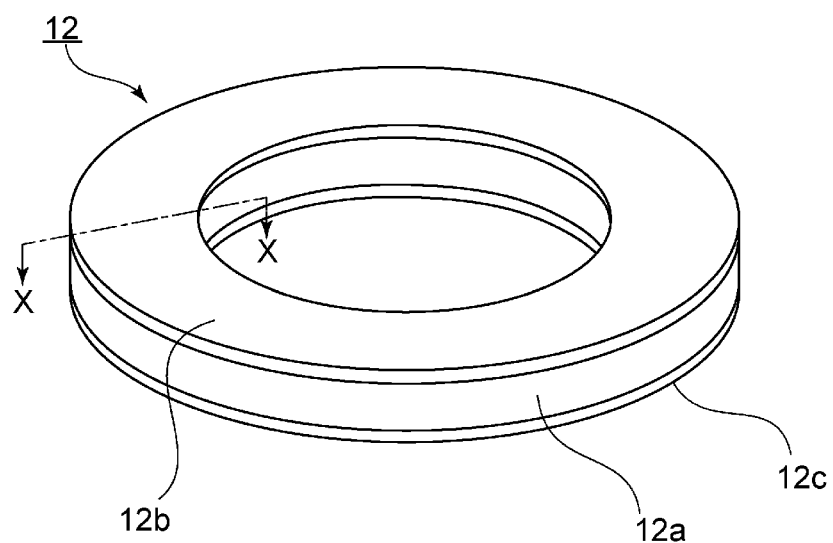
FIG. 3A is a perspective view of a piezoelectric vibrator used in the first preferred embodiment of the present invention.
Figure 3B:
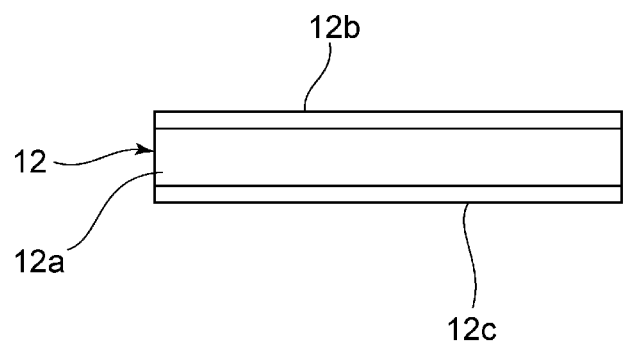
FIG. 3B is a sectional view of the piezoelectric vibrator taken along line X-X in FIG. 3A.
Figure 4A:
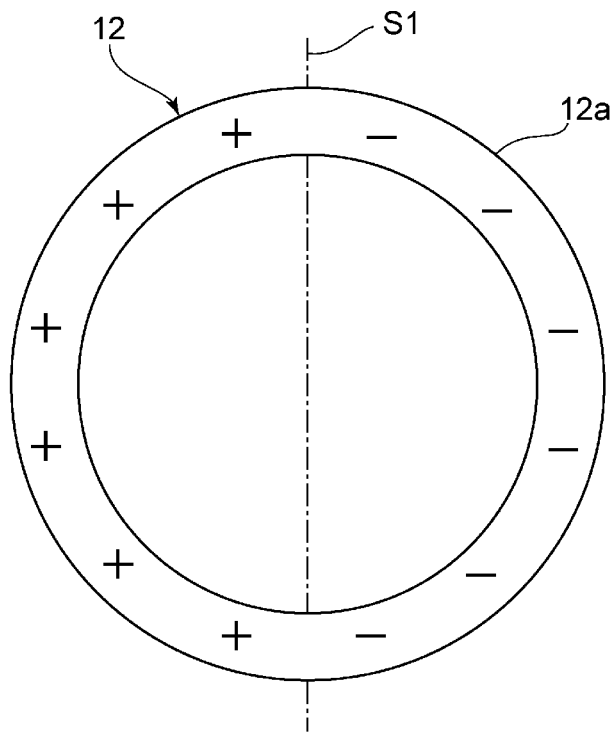
FIGS. 4A and 4B are schematic plan views illustrating first and second examples of polarization structures of the piezoelectric vibrator used in the first preferred embodiment of the present invention.
Figure 4B:
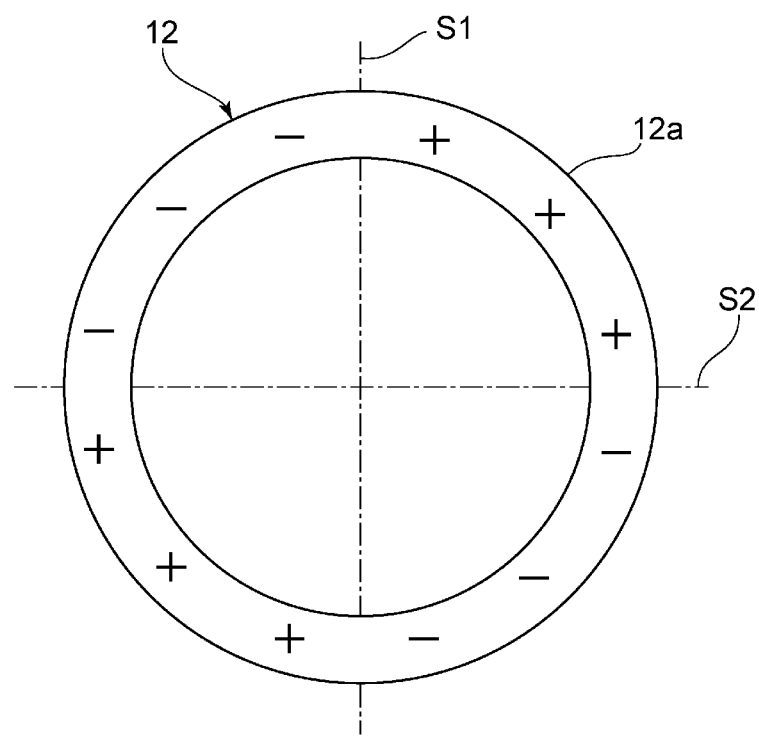

As illustrated in FIGS. 3A and 3B, the piezoelectric vibrator 12 includes a ring-shaped piezoelectric body layer 12a. An electrode 12b is provided on the top surface of the piezoelectric body layer 12a over the entire or substantially the entire area thereof. An electrode 12c is provided on the bottom surface of the piezoelectric body layer 12a over the entire or substantially the entire area thereof. FIGS. 4A and 4B are schematic plan views illustrating first and second examples of polarization structures of the piezoelectric body layer 12a of the piezoelectric vibrator 12.

Referring to FIGS. 4A and 4B, + and − indicate that the piezoelectric body layer 12a is polarized in opposite directions along the thickness direction. Accordingly, in the polarization structure illustrated in FIG. 4A, one side and the other side of a one-dot chain line S1 are polarized in opposite directions along the thickness direction. Therefore, when an alternating-current electric field is applied across the electrodes 12b and 12c, one side and the other side of the one-dot chain line S1 are driven in opposite phases. In the polarization structure illustrated in FIG. 4B, four sections divided from each other by one-dot chain lines S1 and S2 are polarized such that sections adjacent to each other in the circumferential direction are polarized in opposite directions. Therefore, when an alternating-current electric field is applied across the electrodes 12b and 12c, the sections adjacent to each other in the circumferential direction are driven in opposite phases.

The polarization structure of the piezoelectric body layer 12a is not limited to the above-described first and second examples. Referring to FIG. 4B, vibrations in various modes may be excited by arranging a plurality of sections having different polarization directions in the circumferential direction of the ring-shaped piezoelectric body layer 12a.

Figure 5A:
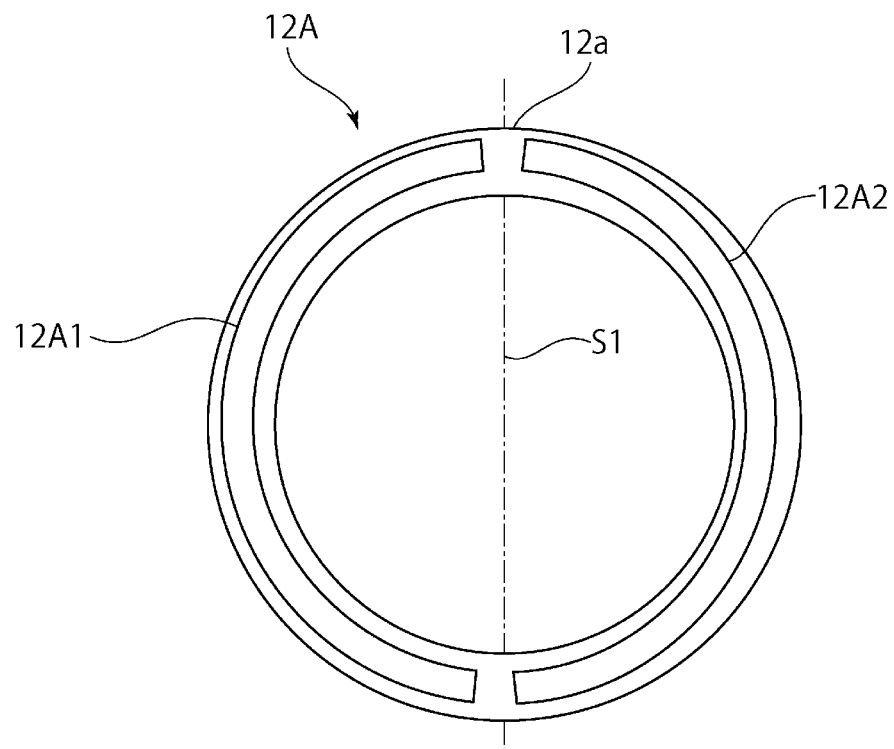
FIGS. 5A and 5B are schematic plan views illustrating electrode structures of piezoelectric vibrators used in first and second modifications of the present invention.
Figure 5B:
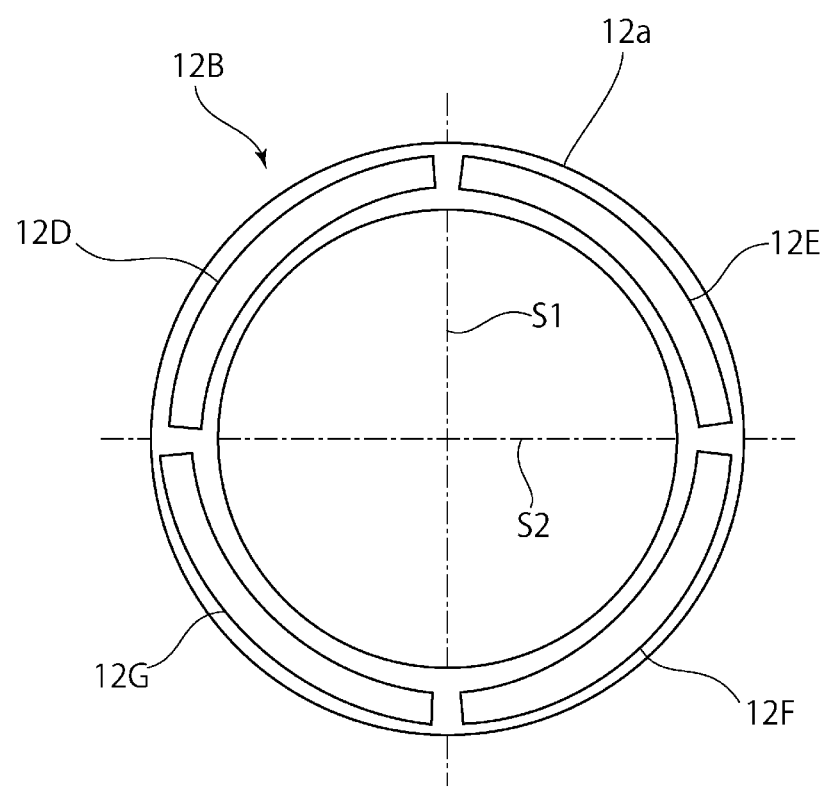

FIGS. 5A and 5B are schematic plan views illustrating the electrode structures of piezoelectric vibrators according to first and second modifications.

FIGS. 5A and 5B respectively illustrate piezoelectric vibrators 12A and 12B in each of which a ring-shaped piezoelectric body layer 12a is uniformly polarized in the thickness direction.

The piezoelectric vibrator 12A according to the first modification includes electrodes 12A1 and 12A2 on one surface of the ring-shaped piezoelectric body layer 12a. The electrode 12A1 is disposed on one side of a one-dot chain line S1, and the electrode 12A2 is disposed on the other side of the one-dot chain line S1. Other electrodes are provided on the other surface of the piezoelectric body layer 12a such that the electrodes face respective ones of the electrodes 12A1 and 12A2. Accordingly, an alternating-current electric field applied across the electrode 12A1 and the corresponding electrode on the other surface and an alternating-current electric field applied across the electrode 12A2 and the corresponding electrode that faces the electrode 12A2 may be set to opposite phases. Thus, one side and the other side of the one-dot chain line S1 are driven in opposite phases.

The piezoelectric vibrator 12B according to the second modification includes a plurality of electrodes 12D to 12G provided on one surface of the ring-shaped piezoelectric body layer 12a. The electrodes 12D to 12G are individually disposed in sections divided from each other by one-dot chain lines S1 and S2. Similarly, four electrodes are also provided on the bottom surface of the ring-shaped piezoelectric body layer 12a such that the electrodes face respective ones of the electrodes 12D to 12G. Vibration similar to the vibration obtained by the polarization structure illustrated in FIG. 4B is excited by applying alternating-current electric fields so that adjacent ones of the regions divided from each other by the one-dot chain lines S1 and S2 receive the alternating-current electric fields in opposite directions.

As described above, vibrations in various modes are able to be excited by the ring-shaped piezoelectric vibrator 12 by adjusting the polarization direction of the piezoelectric body layer 12a or by adjusting the electrode structure and the direction of the alternating-current electric field. The ring-shaped piezoelectric vibrator 12 of the camera water-droplet-removing device 2 includes a plurality of vibration regions disposed in the circumferential direction thereof, and is configured such that adjacent ones of the vibration regions vibrate in opposite directions.

The camera 1 according to the present preferred embodiment includes the camera water-droplet-removing device 2 including the vibrating device 10, and therefore, the water droplets that have adhered to the outer surface of the light transmitting body 17 are able to be easily removed. More specifically, water droplets that have adhered to the outer surface of the light transmitting body 17 in a region in front of the lenses 9, which corresponds to a field-of-view section of the camera 1, are able to be removed by directly atomizing the water droplets or by moving and then atomizing the water droplets. This will be described in more detail below.

FIGS. 6A to 6D are schematic plan views illustrating the displacements of the light transmitting body 17 when the light transmitting body 17 is vibrated in various vibration modes. Vibrations in these modes are able to be excited depending on the combinations of the directions of polarizations or alternating-current voltages described above with reference to FIGS. 4A and 4B and FIGS. 5A and 5B. FIGS. 6A to 6D illustrate the displacements of the light transmitting body 17 during vibration when viewed from the side at which water droplets adhere to the light transmitting body 17.

Figure 6A:
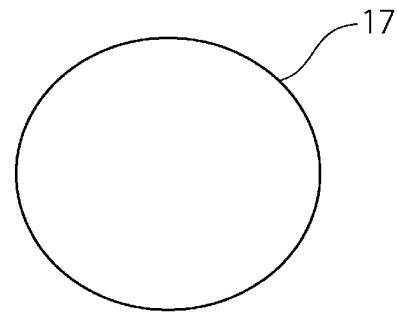
FIGS. 6A to 6D are schematic plan views illustrating (0,0) mode, (1,0) mode, (0,1) mode, and (0,2) mode.
Figure 6B:
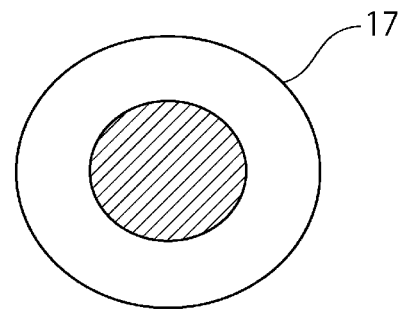
Figure 6C:
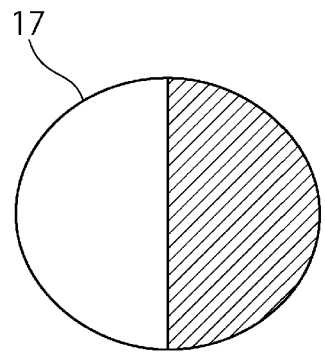
Figure 6D:
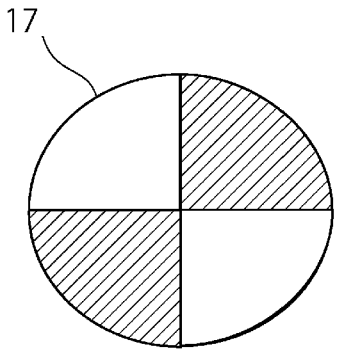

Referring to FIGS. 6B to 6D, the regions hatched with oblique lines and the blank white regions are displaced in opposite phases. For example, regarding to the vibration illustrated in FIG. 6B, the outermost periphery and the outer periphery of the circle hatched with oblique lines (boundary between the blank white region and the region hatched with oblique lines) define vibration nodes. In addition, the central section of the region hatched with oblique lines that is surrounded by the vibration nodes and the middle section of the blank white region that is between the vibration nodes define vibration antinodes.

A mechanical resonance mode of a circular member may be expressed as (m,n) mode, where m is the number of lines of nodes that are provided in the radial direction, and n is the number of lines of nodes that are provided in the circumferential direction. Here, m and n are integers. Accordingly, the vibration mode illustrated in FIG. 6A is (0,0) mode, that in FIG. 6B is (1,0) mode, that in FIG. 6C is (0,1) mode, and that in FIG. 6D is (0,2) mode. The vibration mode may be such that m is 2 or greater and n is 3 or greater, for example.

When the light transmitting body 17 is driven in the vibration mode illustrated in FIG. 6A, the water droplets or other substances that have adhered to the outer surface of the light transmitting body 17 are able to be removed by directly atomizing the water droplets or the other substances. When the light transmitting body 17 is driven in the vibration modes having vibration nodes and antinodes illustrated in FIGS. 6B to 6D, the water droplets or other substances that have adhered to the outer surface of the light transmitting body 17 are able to be removed by moving and then atomizing the water droplets or the other substances. When the light transmitting body 17 is driven, water droplets on the vibration antinodes are atomized, and water droplets on the vibration nodes are moved toward the vibration antinodes. Therefore, when n is 0 and concentric vibration is generated as illustrated in FIG. 6B, the water droplets are able to be moved to the central region of the light transmitting body 17, and then atomized. However, when the water droplets are moved to the central region of the light transmitting body 17, the clarity of the field of view is reduced before the water droplets are atomized. To prevent this, the light transmitting body 17 may instead be driven in vibration modes in which a vibration node is present in the central region of the light transmitting body 17, as illustrated in FIGS. 6C and 6D. When the light transmitting body 17 is vibrated in this manner, the water droplets are able to be moved from the central region toward the peripheral region of the light transmitting body 17, and then be atomized. Accordingly, the clarity of the field of view in the central region of the light transmitting body 17 is higher than that in the case of the vibration mode illustrated in FIG. 6B. The preferable mode is (0,2) mode illustrated in FIG. 6D. The clarity of the field of view is able to be more finely adjusted by appropriately setting a vibration mode other than the above-described vibration modes in accordance with the positions and amount of the liquid droplets.

A method for driving the camera water-droplet-removing device 2 to move, for example, a water droplet B to a peripheral region of the light transmitting body 17 and atomize the water droplet B will now be described.

Figure 7A:
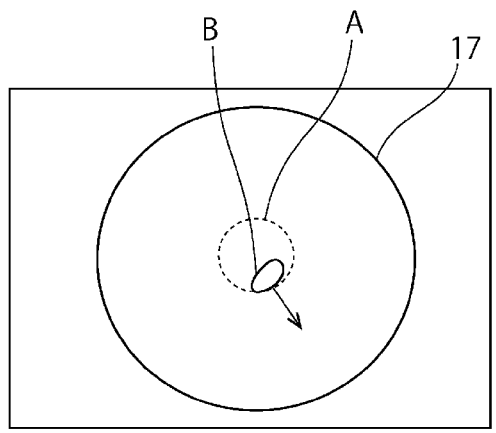
FIGS. 7A to 7E are schematic plan views illustrating steps for moving and atomizing a water droplet that has adhered to a light transmitting body.

Referring to FIG. 7A, assume that the water droplet B has adhered to the light transmitting body 17. The water droplet B is on the light transmitting body 17 in a region surrounded by a broken line A, that is, in a region corresponding to the field-of-view section.

Figure 7D:
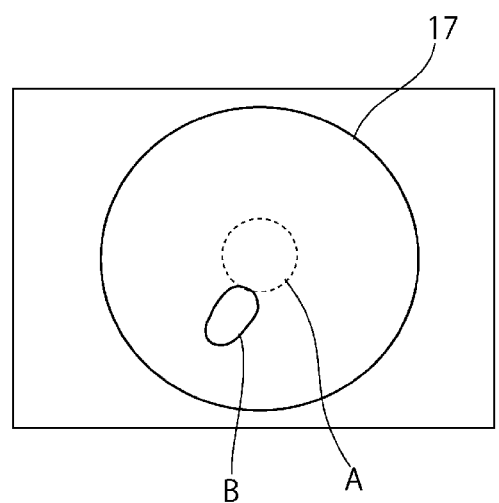
Figure 7B:
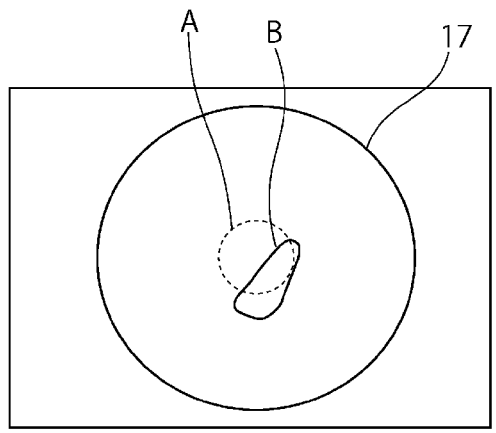
Figure 7E:
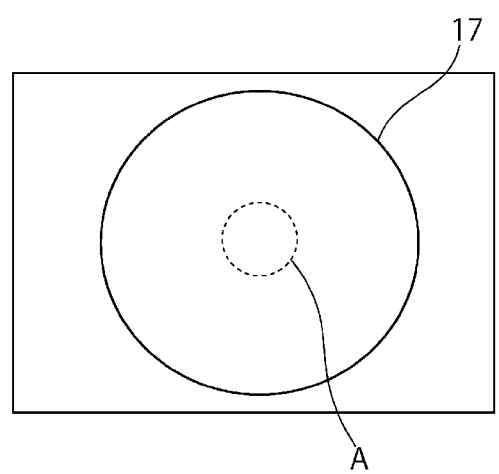
Figure 7C:
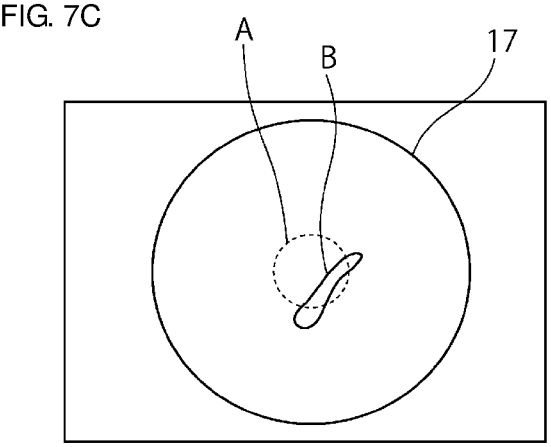

When the light transmitting body 17 is vibrated in, for example, (0,2) mode in which the central region defines a node, as illustrated in FIG. 7B, the contact angle of the water droplet B with respect to the surface of the light transmitting body 17 is reduced, and the water droplet B spreads in a direction toward a vibration antinode. As illustrated in FIGS. 7C and 7D, the water droplet B gradually moves toward the peripheral region, where a vibration antinode is provided. Upon reaching the vibration antinode, the water droplet B is atomized and disappears, as illustrated in FIG. 7E.

The substance that adheres to the camera may be, for example, a solution other than water, such as ethanol, an aqueous solution of salt, an antifreezing agent (calcium chloride), and other solutions, droplets of liquid including water insoluble impurities, such as mud water, or a colloidal solution, such as coffee (hereinafter referred to as liquid droplets). Even in such a case, the substance is able to be removed in the same or similar manner. More specifically, the liquid droplets are atomized while the contents are dissolved therein, so that the liquid droplets that have adhered to the outer surface of the light transmitting body 17 are able to be removed. This operation differs from evaporation, and the liquid droplets are able to be removed together with the solutes/impurities included therein without causing deposition of the solutes/impurities.

The vibrating device 10 of the camera 1 according to the present preferred embodiment includes the bent portion 13 connected to the tubular body 11. Therefore, the load on the piezoelectric vibrator 12 is further reduced. In other words, the tubular body 11 is able to be more efficiently moved by driving the piezoelectric vibrator 12. Therefore, the load on the piezoelectric vibrator 12 to move and atomize the water droplets is able to be reduced. This will be further clarified by comparing Example 1 of the first preferred embodiment with first and second comparative examples described below.

Figure 8:
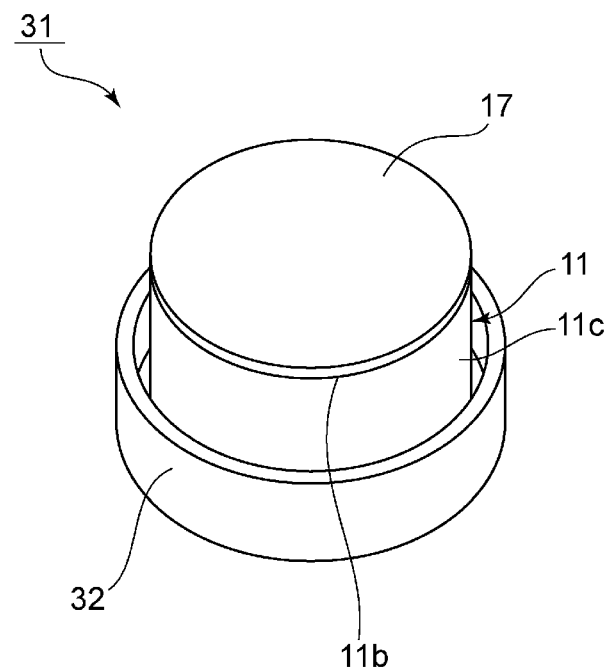
FIG. 8 is a perspective view of a vibrating device according to a second preferred embodiment of the present invention.
Figure 9:
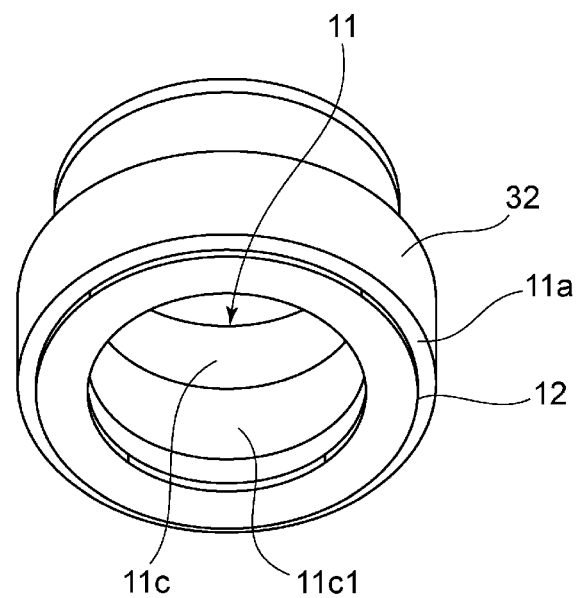
FIG. 9 is a perspective view of a tubular body of the vibrating device according to the second preferred embodiment of the present invention viewed from below a first end surface.

FIG. 8 is a perspective view of a vibrating device according to a second preferred embodiment of the present invention. FIG. 9 is a perspective view of a tubular body of the vibrating device according to the second preferred embodiment viewed from below a first end surface.

A vibrating device 31 according to the second preferred embodiment includes a cylindrical tubular body 11 including a first end surface 11a and a second end surface 11b. A bent portion 32, which is bent outward in the radial direction of the tubular body 11, is provided near the first end surface 11a. Therefore, the inner surface of the bent portion 32 faces the outer surface of a side wall portion 11c with a gap therebetween. Thus, the tubular bent portion 32 may be structured such that the side wall portion 11c is bent outward. The support member is able to be more easily connected to the vibrating device 10 according to the first preferred embodiment. Therefore, in terms of the arrangement of the support member, the vibrating device 10 of the first preferred embodiment is more preferable.

Figure 10:
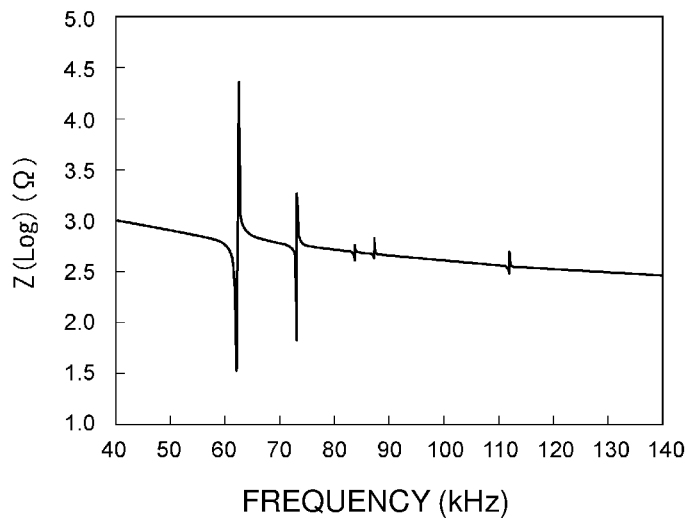
FIG. 10 is a graph showing resonance characteristics of the vibrating device according to the second preferred embodiment of the present invention.

FIG. 10 is a graph showing resonance characteristics obtained when the vibrating device 10 according to the second preferred embodiment is vibrated. FIG. 10 shows that vibrational responses in various modes appear at various frequencies.

Figure 11:
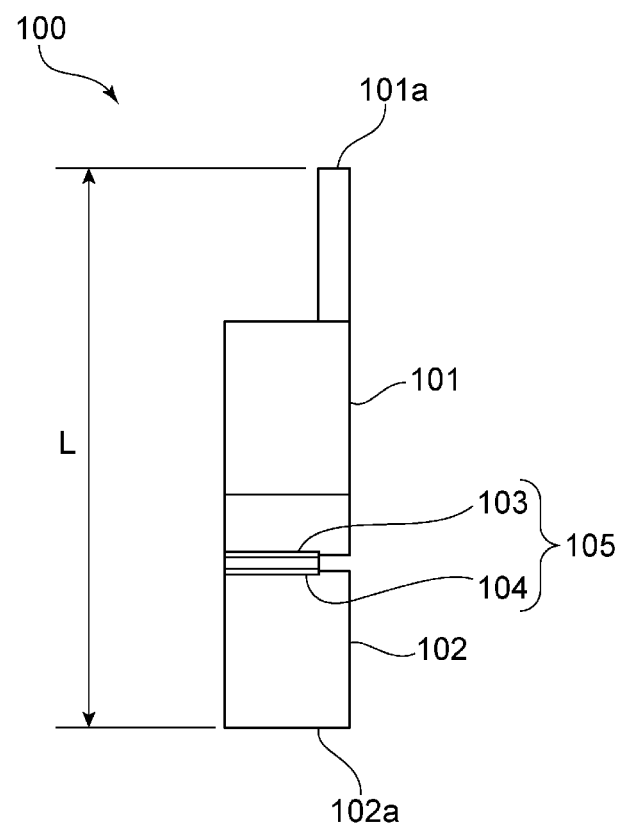
FIG. 11 is a schematic diagram of a vibrating device according to a first comparative example.
Figure 12:
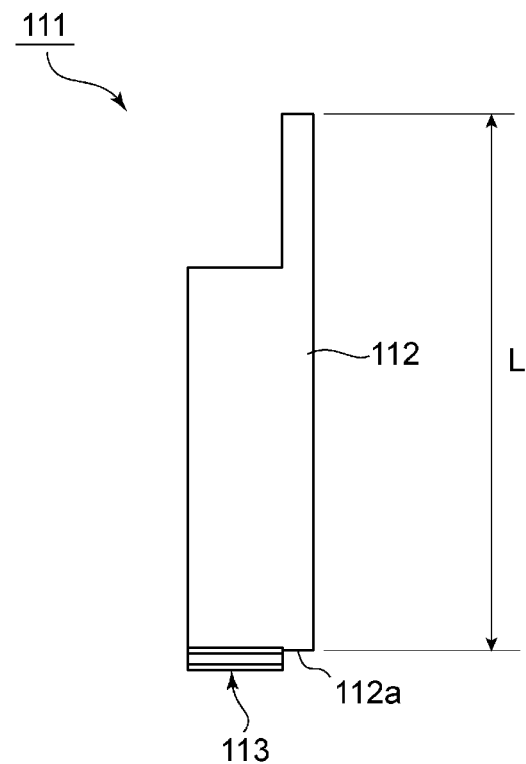
FIG. 12 is a schematic diagram of a vibrating device according to a second comparative example.
Figure 13:
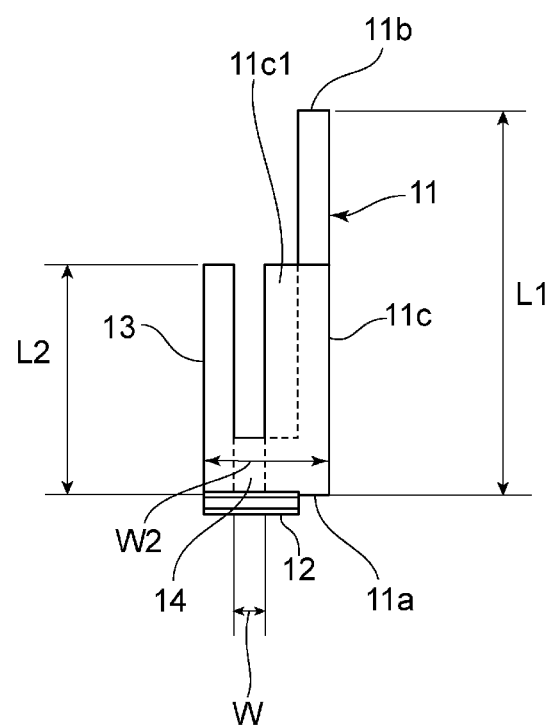
FIG. 13 is a schematic diagram illustrating a vibrating device according to Example 1.

FIGS. 11 to 13 show vibrating devices according to a first comparative example, a second comparative example, and Example 1 of the first preferred embodiment. More specifically, each figure is a sectional view of only the right half of a portion of a vibrating device including a side wall portion of a tubular body and a piezoelectric vibrator. Displacements of the vibrating devices according to Example 1 of the first preferred embodiment and the first and second comparative examples in a first mode, a second mode, and a third mode will be described below.

The first, second, and third modes are vibration modes of the tubular body and the piezoelectric vibrator, and do not correspond to the above-described vibration modes of the light transmitting body.

More specifically, the first, second, and third modes are three vibration modes used to compare the displacements in Example 1 and the first and second comparative examples.

The vibrating device illustrated in the schematic diagram of FIG. 13 was manufactured as the vibrating device according to Example 1 of the first preferred embodiment. FIG. 13 is a sectional view of a portion of the vibrating device 10 taken in the length direction of the tubular body 11. The bent portion is disposed inside the tubular body 11 such that the bent portion 13 faces the inner surface of the side wall portion 11c of the tubular body 11 with a gap therebetween. The piezoelectric vibrator 12 is provided on the bottom surface of the connecting portion 14. The side wall portion 11c includes the thick portion 11c1. The tubular body 11 is made of stainless steel.

The dimension of the tubular body 11 in the length direction that connects the first end surface 11a and the second end surface 11b is denoted by L1. The sum of the dimension of the bent portion 13 in the length direction and the dimension of the connecting portion 14 in the length direction is denoted by L2. The width of the gap between the tubular body 11 and the bent portion 13 is denoted by W. The radial dimension equivalent to the distance from the outer wall of the side wall portion 11c of the tubular body 11 to an end portion of the connecting portion 14 in the radial direction is denoted by W2. A length L is defined as $L=L1+L2+W$.

The inner and outer diameters of the tubular body 11 are, for example, about 16 mm and about 24 mm, respectively, and the inner diameter of an end portion of the tubular body 11 excluding the thick portion is, for example, about 22 mm. The dimension of the end portion excluding the thick portion in the length direction is, for example, about 5 mm. The length L given above is, for example, about 17.5 mm, W is about 1 mm, and W2 is about 4 mm.

The dimension L2 is preferably less than or equal to about ½ of the dimension L1. In the case in which the dimension L2 is greater than about ½ of the dimension L1, a large number of unintended vibration nodes are generated when the vibrating device 10 is driven, and vibration loss may occur.

Referring to FIG. 11, a vibrating device 100 according to the first comparative example includes piezoelectric vibrators 103 and 104 disposed between a tubular body 101 and a tubular support portion 102. In other words, a Langevin piezoelectric vibrating unit 105 including the piezoelectric vibrators 103 and 104 is provided. Also in FIG. 11, the tubular body 101 is cylindrical, and FIG. 11 shows a sectional view of a portion of the tubular body 101 taken in the length direction. Accordingly, the piezoelectric vibrators 103 and 104 are also donut-shaped. The distance between an end surface 101a of the tubular body 101 and an end surface 102a of the support portion 102 is denoted by L. This distance L is equal or substantially equal to the distance L according to Example 1.

FIG. 12 is a schematic diagram illustrating a vibrating device 111 according to the second comparative example. The vibrating device 111 according to the second comparative example includes a ring-shaped piezoelectric vibrator 113, which is similar to the piezoelectric vibrator 12 according to Example 1, on a bottom end surface 112a of a tubular body 112. Also in the second comparative example, the dimension L of the tubular body 112 in the length direction is equal or substantially equal to the dimension L according to Example 1.

The widths (radial dimensions) of the tubular bodies 101 and 112 according to the first and second comparative examples are equal or substantially equal to the width W2 in Example 1. The thickness of an end portion on which a light transmitting body is provided is also equal or substantially equal to that in Example 1.

Figure 14:
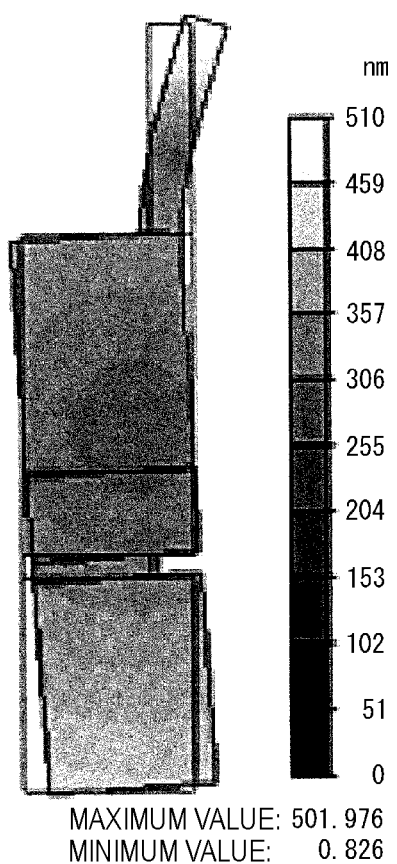
FIG. 14 is a schematic diagram illustrating displacements in vibration in a first mode according to the first comparative example.
Figure 15:
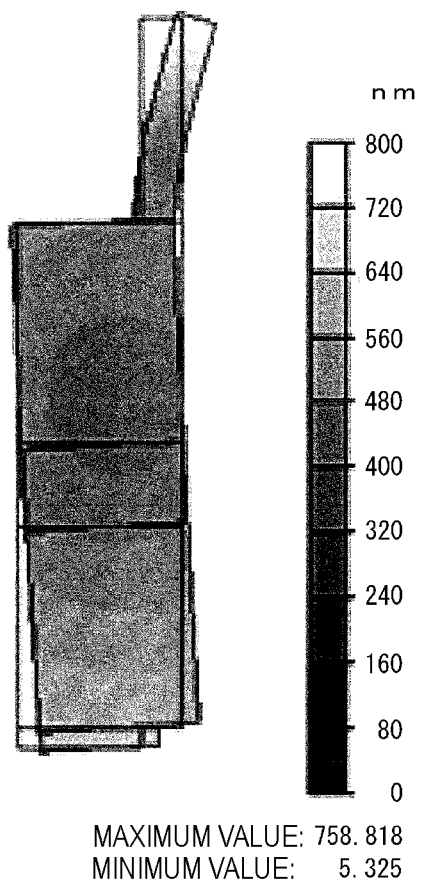
FIG. 15 is a schematic diagram illustrating displacements in vibration in the first mode according to the second comparative example.
Figure 16:
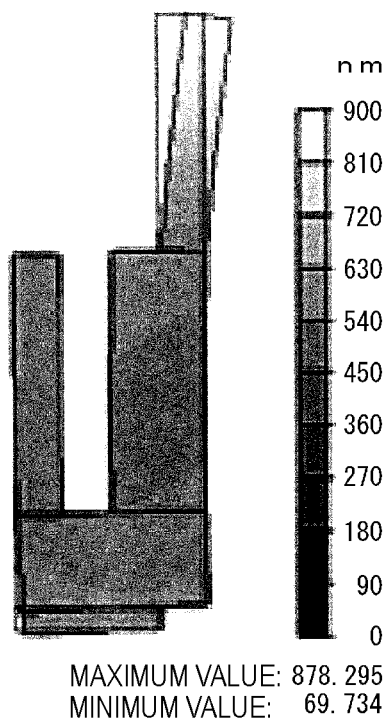
FIG. 16 is a schematic diagram illustrating displacements in vibration in the first mode according to Example 1.
Figure 17:
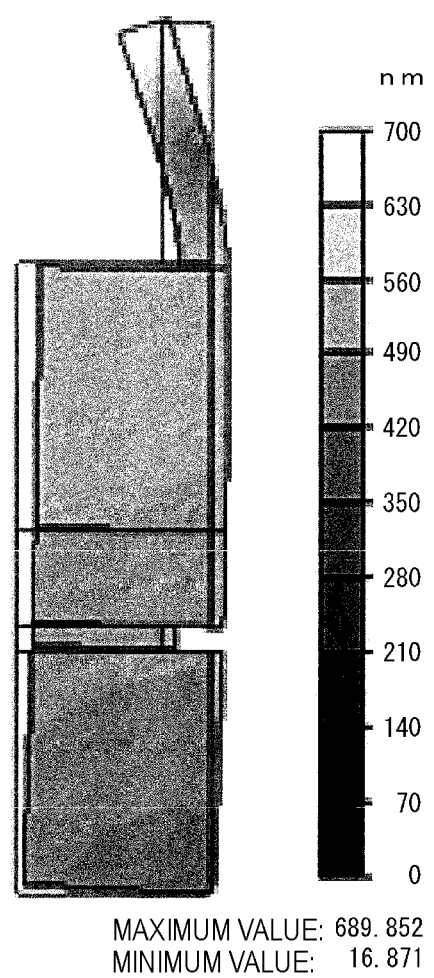
FIG. 17 is a schematic diagram illustrating displacements in vibration in a second mode according to the first comparative example.
Figure 18:
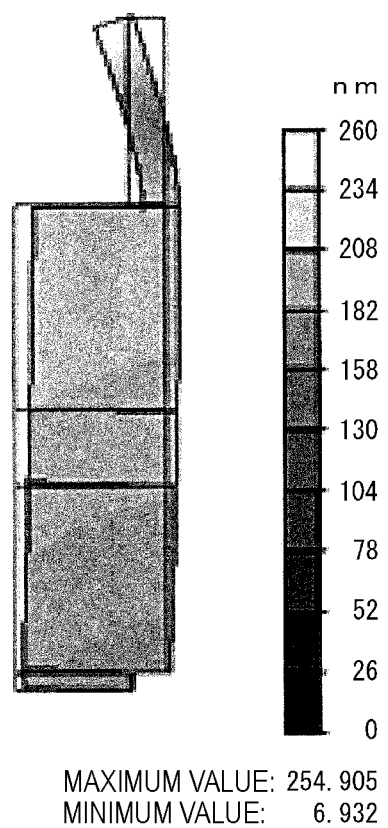
FIG. 18 is a schematic diagram illustrating displacements in vibration in the second mode according to the second comparative example.
Figure 19:
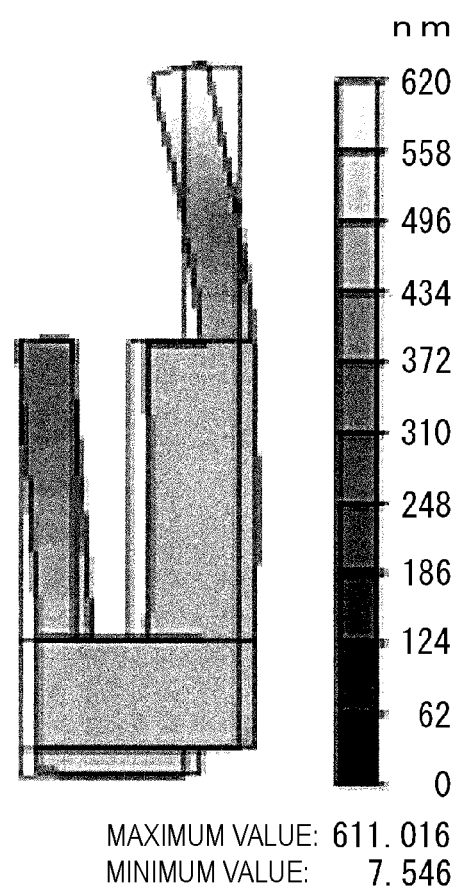
FIG. 19 is a schematic diagram illustrating displacements in vibration in the second mode according to Example 1.
Figure 20:
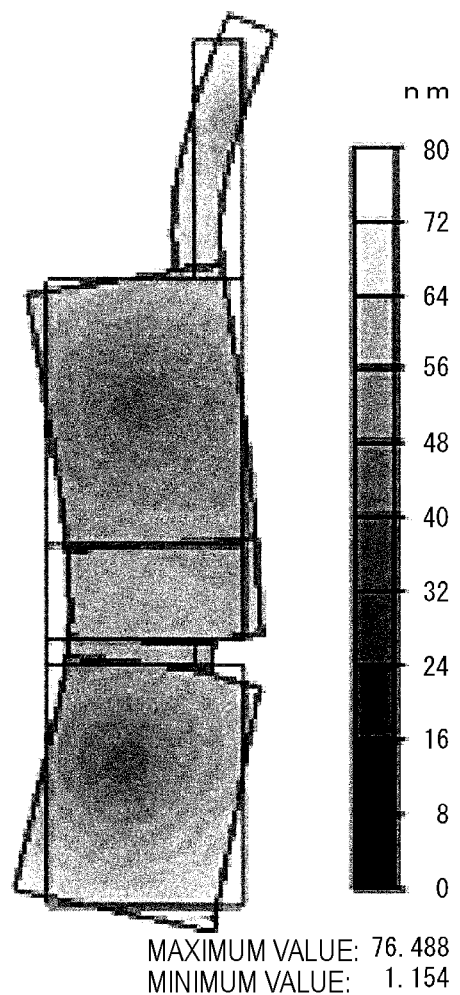
FIG. 20 is a schematic diagram illustrating displacements in vibration in a third mode according to the first comparative example.
Figure 21:
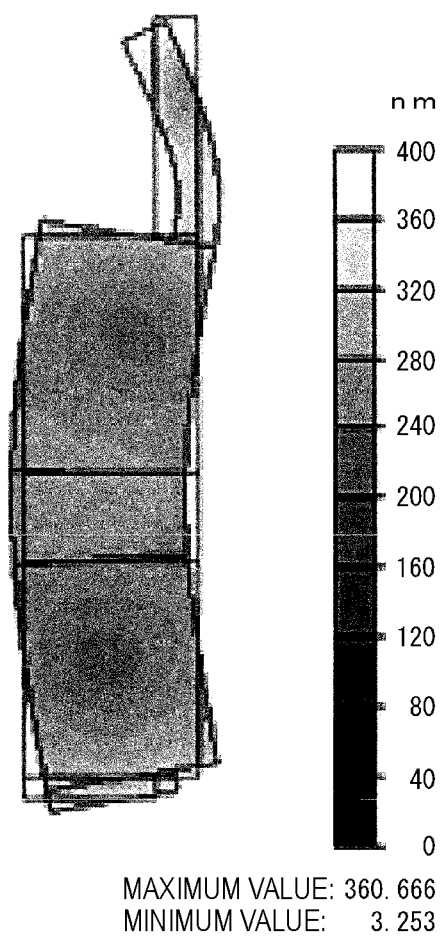
FIG. 21 is a schematic diagram illustrating displacements in vibration in the third mode according to the second comparative example.
Figure 22:
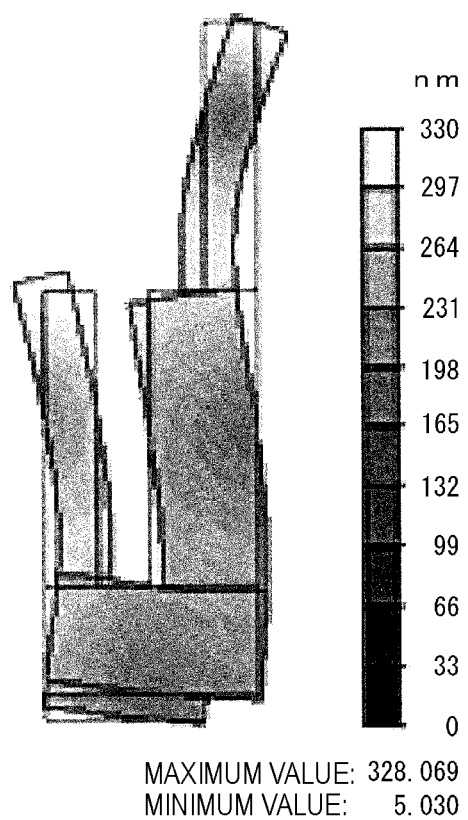
FIG. 22 is a schematic diagram illustrating displacements in vibration in the third mode according to Example 1.

FIGS. 14 to 16 show the simulation results of displacements of the vibrating devices 10, 100, and 111 according to the first comparative example, the second comparative example, and Example 1 in the first mode. FIGS. 17 to 19 show the displacements according to the first comparative example, the second comparative example, and Example 1 in vibrations in the second mode. FIGS. 20 to 22 show the displacements according to the first comparative example, the second comparative example, and Example 1 in vibrations in the third mode.

In each of the schematic diagrams of FIGS. 14 to 22, the scale of displacement on the right indicates the amount of displacement by the color density in the schematic diagram. FIGS. 14 to 22 also show the maximum and minimum values of the amount of displacement.

Table 1 below shows the maximum value of the amount of displacement of each of the vibrating devices illustrated in FIGS. 14 to 22 and the ratio of the maximum value A of the amount of vibration displacement of the vibrating device to the maximum amount of displacement B of the piezoelectric vibrator.

TABLE 1

|  |  | First Mode | Second Mode | Third Mode |
|---|---|---|---|---|
| First Comparative Example | Maximum Value A of Amount of Displacement (nm) | 501.976 | 689.852 | 76.488 |
|  | Maximum Amount of Displacement B of Piezoelectric Vibrator (nm) | 156 | 248 | 33 |
|  | A/B | 3.2 | 2.7 | 2.07 |
| Second Comparative Example | Maximum Value A of Amount of Displacement (nm) | 758.818 | 254.905 | 360.666 |
|  | Maximum Amount of Displacement B of Piezoelectric Vibrator (nm) | 453 | 56 | 261 |
|  | A/B | 1.67 | 4.48 | 1.38 |
| Example 1 | Maximum Value A of Amount of Displacement (nm) | 878.295 | 611.016 | 328.069 |
|  | Maximum Amount of Displacement B of Piezoelectric Vibrator (nm) | 278 | 282 | 134 |
|  | A/B | 3.15 | 2.16 | 2.44 |

As is clear from Table 1, when vibration in the first mode is generated, for example, according to the first comparative example, the maximum value of the amount of displacement of the tubular body is about 501.976 nm, the maximum amount of displacement of the piezoelectric vibrator is about 156 nm, and the ratio of the maximum value of the amount of displacement to the maximum amount of displacement of the piezoelectric vibrator is about 3.2. According to Example 1, when vibration in the first mode is generated, the maximum value of the amount of displacement of the tubular body is about 878.295 nm, which is very large, and the maximum amount of displacement of the piezoelectric vibrator is about 278 nm, which is relatively small. The ratio between them is about 3.15.

According to the second comparative example, the maximum value of displacement is about 758.818 nm, which is somewhat less than that of Example 1 but is still large. However, the maximum amount of displacement of the piezoelectric vibrator is about 453 nm, which is very large. This shows that a large load is imposed on the piezoelectric vibrator.

Also in the second mode and the third mode, according to Example 1, the maximum value of the amount of displacement of the tubular body is greater than or equal to those according to the first and second comparative examples, and the amount of displacement of the piezoelectric vibrator is small. In particular, according to Example 1, the amount of displacement of the piezoelectric vibrator is less than or equal to about ½ of the maximum value of the tubular body in all of the first to third modes. Thus, the load imposed on the piezoelectric vibrator is small.

Furthermore, when the vibrating devices have the same or substantially the same distance L as described above, the vibrating device 10 has a smaller dimension in the length direction because the vibrating device 10 includes the bent portion 13. It is preferable that vibrating devices have a smaller height, and the height thereof is preferably as small as possible. When the above-described vibrating devices are driven in the same vibration mode at the same driving frequency, the vibrating device including the bent portion 13 generates an amount of vibration equivalent to those generated by the vibrating devices including no bent portion, and is shorter than the vibrating devices including no bent portion. Thus, the overall height of the vibrating device 10 is smaller than that of a vibrating device including a Langevin piezoelectric vibrating unit.

In the first comparative example, the Langevin piezoelectric vibrating unit 105 needs to be disposed between the tubular body 101 and the tubular support portion 102. Therefore, three members are required. In contrast, in the vibrating device 10 according to Example 1, the tubular body 11 and the bent portion 13 may be integrally provided. Thus, the numbers of materials and members are able to be reduced.

According to the first comparative example, since the Langevin piezoelectric vibrating unit is used, the arrangement of lead-out wires for the electrodes is complex, and there is a risk of short-circuiting. Such a risk may be reduced by disposing the piezoelectric vibrator 113 on the bottom end surface 112a of the tubular body 112, as in the second comparative example, and simplifying the arrangement of lead-out wires for the electrodes. However, when the piezoelectric vibrator is simply disposed on the bottom end surface of the tubular body without providing a bent portion, the bottom end surface of the tubular body is vibrated at a large amplitude. Therefore, the risk of the occurrence of cracks in the piezoelectric vibrator cannot be reduced. According to the vibrating device 10, the load imposed on the piezoelectric vibrator 12 is able to be reduced, and the arrangement of the lead-out wires for the electrodes is able to be simplified.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vibrating device comprising:
   a tubular body including a first end surface, a second end surface that is opposite to the first end surface, and a side wall portion that connects the first and second end surfaces, the first and second end surfaces each including an opening;
   a piezoelectric vibrator provided on the first end surface of the tubular body; and
   a light transmitting body that is directly or indirectly connected to the second end surface of the tubular body and covers the opening in the second end surface of the tubular body; wherein
   a connecting portion is connected to the first end surface of the tubular body in a region inside or outside the opening in the first end surface;
   a tubular bent portion is connected to a surface of the connecting portion that faces toward the second end surface of the tubular body; and the tubular bent portion extends in a direction from the first end surface toward the second end surface of the tubular body.

2. The vibrating device according to claim 1, wherein the connecting portion is connected to an outer side of the first end surface of the tubular body, and the bent portion faces an outer surface of the side wall portion.

3. The vibrating device according to claim 1, wherein the connecting portion is connected to an inner side of the first end surface of the tubular body, and the bent portion faces an inner surface of the side wall portion.

4. The vibrating device according to claim 1, further comprising a support connected to the side wall portion of the tubular body.

5. The vibrating device according to claim 1, wherein the tubular body is cylindrical.

6. The vibrating device according to claim 1, wherein the piezoelectric vibrator extends from the first end surface of the tubular body to a surface of the connecting portion that faces away from the second end surface.

7. The vibrating device according to claim 1, wherein when a direction connecting the first end surface and the second end surface of the tubular body is defined as a length direction of the tubular body, a sum of a dimension of the bent portion in the length direction and a dimension of the connecting portion in the length direction is less than or equal to about ½ of a dimension of the tubular body in the length direction.

8. A camera water-droplet-removing device comprising:
the vibrating device according to claim 1; wherein
the camera water-droplet-removing device defines a camera main body including a lens; and
the light transmitting body is the lens of the camera main body or a cover including a light transmitting portion disposed in front of the lens of the camera main body.

9. The camera water-droplet-removing device according to claim 8, wherein the connecting portion is connected to an outer side of the first end surface of the tubular body, and the bent portion faces an outer surface of the side wall portion.

10. The camera water-droplet-removing device according to claim 8, wherein the connecting portion is connected to an inner side of the first end surface of the tubular body, and the bent portion faces an inner surface of the side wall portion.

11. The camera water-droplet-removing device according to claim 8, further comprising a support connected to the side wall portion of the tubular body.

12. The camera water-droplet-removing device according to claim 8, wherein the tubular body is cylindrical.

13. The camera water-droplet-removing device according to claim 8, wherein the piezoelectric vibrator extends from the first end surface of the tubular body to a surface of the connecting portion that faces away from the second end surface.

14. The camera water-droplet-removing device according to claim 8, wherein when a direction connecting the first end surface and the second end surface of the tubular body is defined as a length direction of the tubular body, a sum of a dimension of the bent portion in the length direction and a dimension of the connecting portion in the length direction is less than or equal to about ½ of a dimension of the tubular body in the length direction.

15. A camera comprising:
a camera water-droplet-removing device including the vibrating device according to claim 1; and
a camera main body, at least a portion of which is disposed in the camera water-droplet-removing device.

16. The camera according to claim 15, wherein the connecting portion is connected to an outer side of the first end surface of the tubular body, and the bent portion faces an outer surface of the side wall portion.

17. The camera according to claim 15, wherein the connecting portion is connected to an inner side of the first end surface of the tubular body, and the bent portion faces an inner surface of the side wall portion.

18. The camera according to claim 15, further comprising a support connected to the side wall portion of the tubular body.

19. The camera according to claim 15, wherein the tubular body is cylindrical.

20. The camera according to claim 15, wherein the piezoelectric vibrator extends from the first end surface of the tubular body to a surface of the connecting portion that faces away from the second end surface.

* * * * *